United States Patent
Odajima et al.

(10) Patent No.: US 7,113,459 B2
(45) Date of Patent: Sep. 26, 2006

(54) OPTICAL DEVICE, INFORMATION RECORDING/REPRODUCING APPARATUS USING THE OPTICAL DEVICE

(75) Inventors: Wataru Odajima, Kawasaki (JP); Shinya Hasegawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 306 days.

(21) Appl. No.: 10/702,134

(22) Filed: Nov. 5, 2003

(65) Prior Publication Data
US 2004/0131002 A1 Jul. 8, 2004

Related U.S. Application Data

(63) Continuation of application No. PCT/JP01/03844, filed on May 8, 2001.

(51) Int. Cl.
*G11B 7/00* (2006.01)
(52) U.S. Cl. .................. 369/44.23; 369/44.27; 369/44.37; 369/112.28; 369/112.23
(58) Field of Classification Search .............. None
See application file for complete search history.

(56) References Cited

U.S. PATENT DOCUMENTS 5,777,960 A * 7/1998 Ohno .................. 369/44.14

FOREIGN PATENT DOCUMENTS

| EP | 0 789 356 A1 | 8/1997 |
|---|---|---|
| JP | 5-81697 | 4/1993 |
| JP | 6-68117 | 3/1994 |
| JP | 7-37259 | 2/1995 |
| JP | 08-180451 | 7/1996 |
| JP | 8-180451 | 7/1996 |
| JP | 9-017015 | 1/1997 |
| JP | 9-147403 | 6/1997 |
| JP | 9-147405 | 6/1997 |
| JP | 10-091996 | 4/1998 |
| JP | 10-112034 | 4/1998 |
| JP | 10-199018 | 7/1998 |
| JP | 2000-331368 | 11/2000 |

* cited by examiner

*Primary Examiner*—Muhammad Edun
(74) *Attorney, Agent, or Firm*—Greer, Burns & Crain, Ltd.

(57) ABSTRACT

An optical device and an information recording/reproducing apparatus using the optical device are disclosed. Incident light is output to a path selected from a plurality of paths so that an optical path can be secured with high precision for a separated (two-part) optical system. The optical device and the information recording/reproducing apparatus include a first reflective unit for reflecting the incident light in a fixed direction, and a second reflective unit for reflecting the light received from the first reflective unit to a second optical path. The two reflective units are movable in a body between two positions, one position being on a first optical path, and the other position being in an evacuation position where the first optical path is not intercepted.

6 Claims, 12 Drawing Sheets

OPTICAL DEVICE, INFORMATION RECORDING/REPRODUCING APPARATUS USING THE OPTICAL DEVICE

This is a continuation of International PCT Application No. PCT/JP01/03844, filed May 8, 2001.

TECHNICAL FIELD

The present invention generally relates to an optical device, and an information recording/reproducing apparatus that includes the optical device, and specifically relates to an optical device, and an information recording/reproducing apparatus that includes the optical device, where an incident light is switched between two or more output paths.

BACKGROUND TECHNOLOGY

Figure 1:
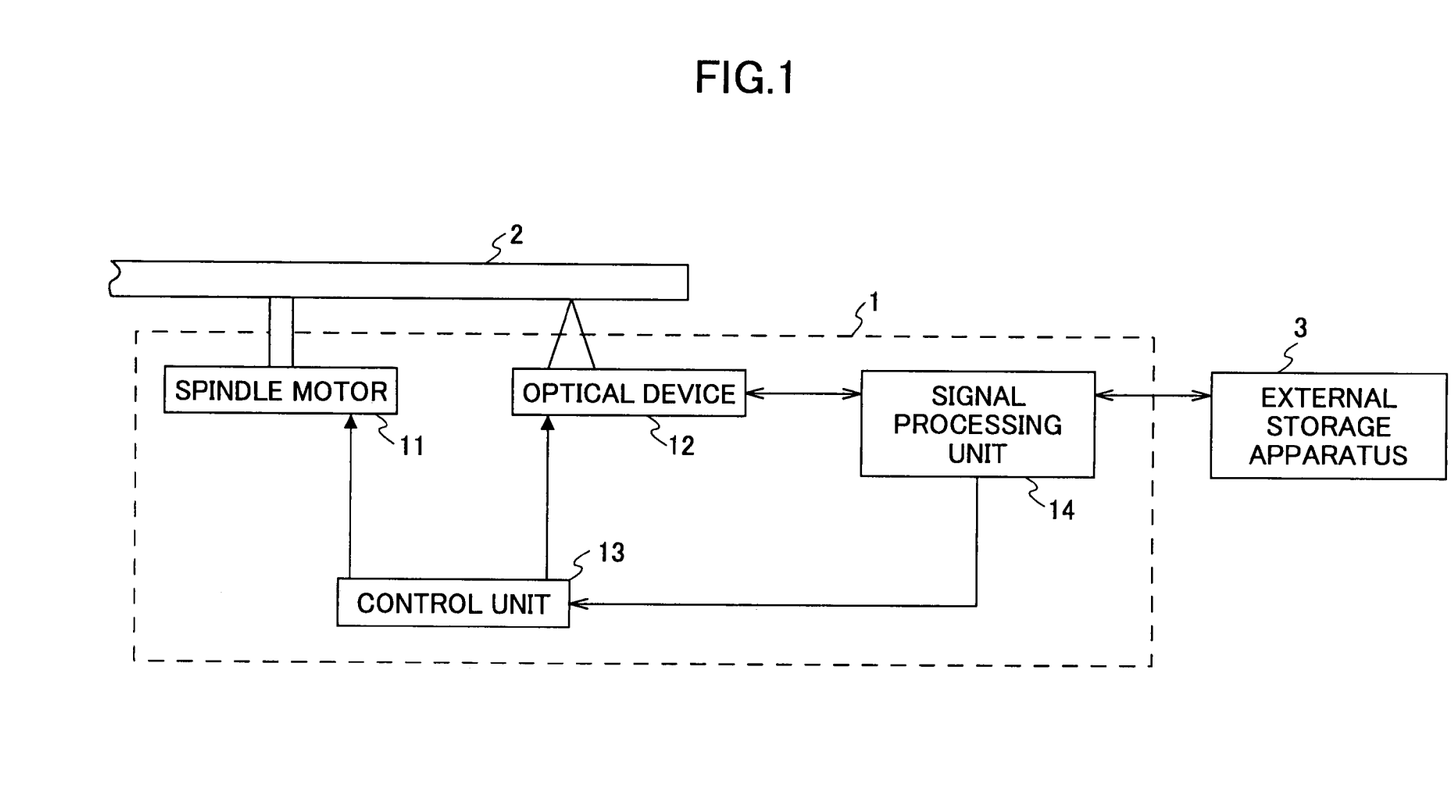
FIG. 1 is a block diagram of an optical disk apparatus.

FIG. 1 shows a block diagram of an optical disk apparatus 1.

The optical disk apparatus 1 includes a spindle motor 11, an optical device 12, a control unit 13, and a signal-processing unit 14. The optical. disk apparatus 1 is provided with an optical disk 2. The optical disk 2 is engaged by the spindle motor 11. The spindle motor 11 rotates the optical disk 2 at a predetermined rotational speed according to directions from the control unit 13.

The optical device 12 irradiates light to the optical disk 2. The light is reflected by the optical disk 2, and the light reflected by the optical disk 2 is supplied to the optical device 12. The optical device 12 detects the reflected light from the optical disk 2, and outputs a signal that is detected. The detected signal output from the optical device 12 is supplied to the signal-processing unit 14. The signal-processing unit 14 demodulates and decodes the detected signal, and information recorded on the optical disk 2 is obtained. The information decoded by the signal-processing unit 14 is supplied to an external storage apparatus 3.

Various optical recording media are currently available, such as compact disks (CD), and digital video disks (DVD). The optical disk apparatus 1 is required to be compatible with the various optical recording media.

A high data density is obtained if a semiconductor laser included in the optical device 12 irradiates short wavelength light. The diameter of an optical spot formed by a condensing optical system with a given numerical aperture (Numerical Aperture, NA) is proportional to the wavelength of the light to be used. By using a short wavelength laser for reading and writing information, recording pits can be made small, and high density can be attained. Previously, it was difficult for a semiconductor laser to generate short-wavelength light, because the gain required for laser oscillation was difficult to obtain. However, recently and continuing, semiconductor lasers capable of oscillating at a wavelength of 410 nm at normal temperature for a long time are being commercialized, and are used in optical disk apparatuses. Further, research on recording materials for short-wavelength is advancing.

The condensing spot can be made small, when the wavelength is held constant, by increasing NA of the condensing optical system. For example, NA of a pickup for a CD is 0.45, and NA of an objective lens for a DVD is 0.60.

In order to avoid collisions between the disk and the lens, the optical disk apparatus 1 is provided with a sufficient working distance. Further, weight of the objective lens provided to a carriage must be as light as possible in order to facilitate movement. For this reason, the objective lens cannot be thick.

It is possible to realize a thin lens having a high NA by designing the lens surface as an aspheric surface that is defined by a high order polynomial. However, in the past it was difficult to manufacture a lens with the required precision. Through improvements in processing technology, such an objective lens that can be applied to an optical disk apparatus has at last become available.

Further, requirements concerning aberration of the lens having a high NA are also severe, coma aberration generated by inclination of a medium increasing in proportion to the third power of the NA. The influence of the aberration is reduced by making substrate thickness of the disk less than conventional optical disks. For example, a CD having a diameter of 120 mm, and having a capacity of 640 MB, is 1.2 mm thick, while a DVD that has the same diameter, and a capacity of 4.7 GB uses two substrates, each of which is 0.6 mm thick, that is, 1.2 mm thick in total.

As mentioned above, specifications of recording media change as higher densities become available. For this reason, optical disk apparatuses are required to be capable of reading/writing not only new higher-density media but also conventional media. Accordingly, an optical head that is capable of providing sufficient optical properties to recording media of differing operating wavelength, NA and substrate thickness is needed. Considering apparatus size and manufacturing cost, it is not realistic to install separate light sources and optical systems corresponding to various media. A common configuration capable of reading/writing different media is required.

Conventionally, a method is considered, whereby the objective lens is common. However, it is difficult to eliminate the aberration generated by the difference in substrate thickness. Especially, in the case of a separated (two body) optical system that is designed for high-speed access, wherein the light source and the detection system are fixed, and only the objective lens moves for seeking; since the objective lens moves extensively in relation to the light source, the light incident on the objective lens cannot be greatly different from parallel light. If the incident light turns into divergent or convergent light, the luminous intensity of light changes according to whether the objective lens is near the center of a disk or near the edge of it, and performance is degraded. Accordingly, control of the aberration of the incident light is difficult.

Conversely, when the light source common, the configuration is such that a short wavelength light source is used, and the light is made to pass along an optical path that is different depending on the kind of medium, and different objective lenses are used. Since each objective lens is designed for a substrate for reading/writing at the optimal wavelength to be used, even if there is a difference in substrate thickness, it is easy to suppress the aberration.

Further, NA is determined such that the required spot is obtained, considering the difference in optimal wavelength. About optimization of the diameter of the spot, the difference in optimal wavelength can be compensated for by setup of the NA of an optical system.

The wavelength dependability of a medium and a method of optical-path switching pose problems. The wavelength dependability of the medium appears as a reduction of the signal properties when the wavelength shifts from the optimal wavelength. The problem of wavelength dependability can be solved by designing the optical system so that the resolution is high, and a wide margin of tolerance is provided for normal reading/writing operations of the signal.

On the other hand, as for the problem related to switching of the optical path, a method wherein two objective lenses are mounted to a switching mechanism that switches by rotation is used.

Figure 2:
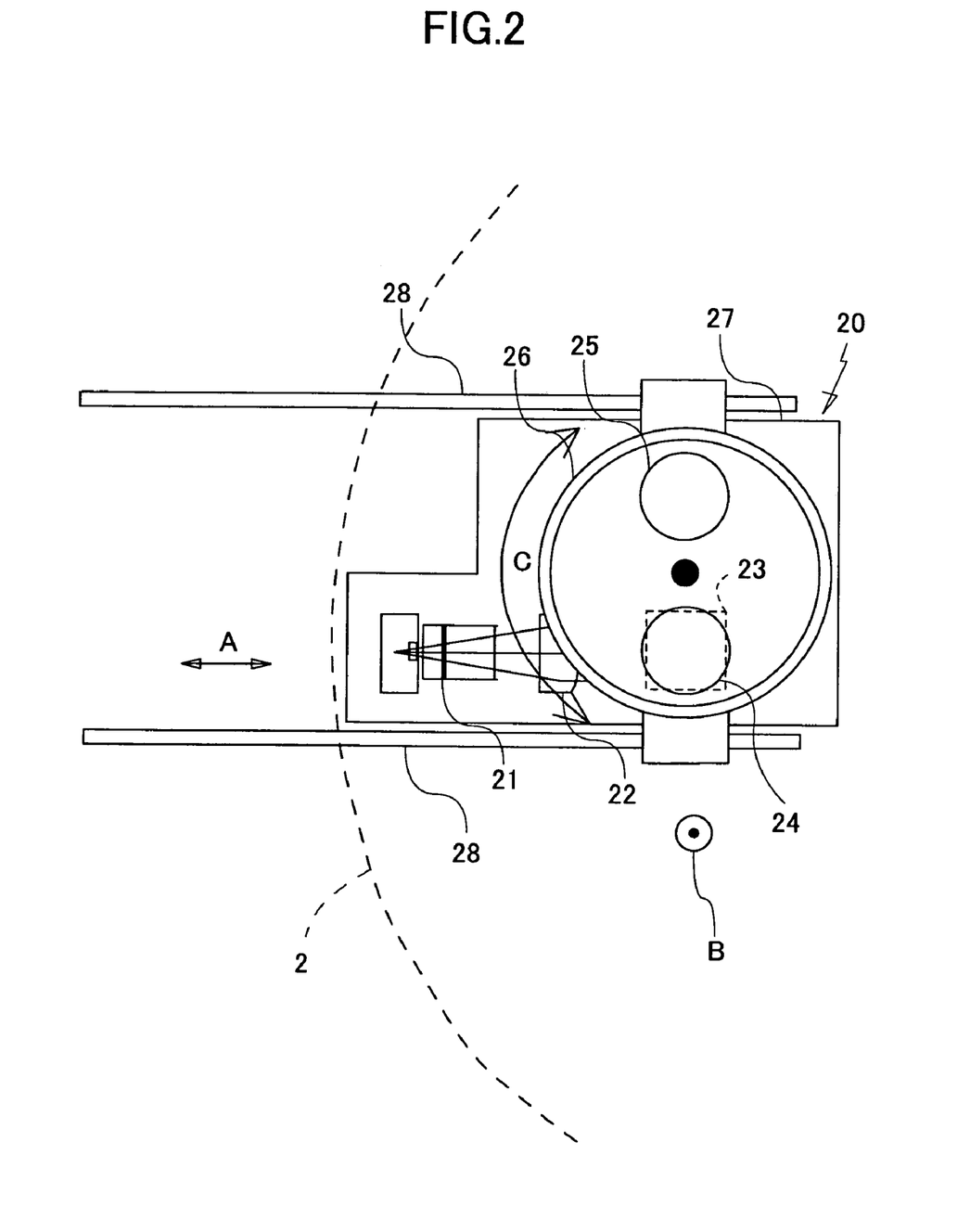
FIG. 2 is a schematic diagram of an example of a conventional optical system.

A block diagram of an example of the conventional optical system is shown in FIG. 2.

The conventional optical system shown in FIG. 2 adopts a one-body optical head with all components installed on a carriage.

A one-body optical pickup 20 shown in FIG. 2 includes an integrated optical head 21, a collimating lens 22, a mirror 23, objective lenses 24 and 25, and a stage 26, all of which are mounted on a carriage 27.

The integrated optical head 21 is an optical device that further includes a light source, a detector for focal error detection, a detector for tracking error detection, and a detector for reproducing-signal detection, all of which are integrated. The light that is irradiated from the integrated optical head 21 is incident to the collimating lens 22. The collimate lens 22 changes the divergence light from the integrated optical head 21 into parallel light. The light output by the collimating lens 22 is incident on the mirror 23. The mirror 23 reflects the light from the collimating lens 22 in the direction of the disk 2, i.e., the direction of arrow B.

The light reflected by the mirror 23 is converged by one of the objective lens 24 or the objective lens 25, and is irradiated to the disk 2. The light irradiated to the disk 2 is reflected by the disk 2, and passes through the objective lens 24 or 15, the mirror 23, and the collimating lens 22 again, and is supplied to the integrated optical head 21.

The objective lenses 24 and 25 are fixed to the stage 26. The stage 26 is arranged so that it can rotate in the direction of arrow C. When the stage 26 rotates, either of the objective lenses 24 or 25 is located above the mirror 23, i.e., the objective lens is switched. The switching of the optical system is carried out in this manner.

The rotating mechanism of the stage 26 (not shown) has to be large in size in order to attain precision. If the stage 26 is enlarged, the mass of the optical pickup 20 becomes large. When the mass of the optical pickup 20 becomes large, there are problems, such as track-seeking speed being decreased.

Further, the optical pickup 20 shown in FIG. 2 requires adjustments of the objective lenses 24 and 25, and adjustments of the switching mechanism, i.e., axial adjustment of the stage 26, which poses problems, such as the assembly process becoming complicated.

For this reason, it is desired that an optical-path switching mechanism of a separated optical system that is capable of high-speed seeking be provided to the fixed optical unit.

The present invention is made in view of the above-mentioned desire, and aims at offering an optical device, and an information recording/reproducing apparatus using the optical device, wherein optical-path switching is made possible using a separated optical system.

Further, the present invention aims at offering an optical device, and an information recording/reproducing apparatus using the optical device, that can provide an optical path with high precision using a separated optical system.

THE DISCLOSURE OF THE INVENTION

According to the present invention, selection of an optical path is enabled by providing a first reflective unit for reflecting incident light in a predetermined direction, a second reflective unit for reflecting the light from the first reflective unit to a second optical path (Note: It is awkward to mention the second optical path before the first, but consistent with the Detailed Description and the Drawings.), and by moving the first reflective unit and the second reflective unit in one body on and off a first optical path.

Further, the present invention enables selection of the optical path by carrying out parallel movement of the first reflective unit and the second reflective unit in one body on and off the first optical path.

Furthermore, the present invention enables selection of the optical path by carrying out rotational movement of the first reflective unit and the second reflective unit in one body on and off the first optical path.

Furthermore, the present invention arranges the first reflective unit and the second reflective unit in one body by using a prism, for example, a rhomboid prism, as a unifying technique. Alternatively, the first reflective unit and the second reflective unit are unified by fixing two mirrors with a supporting unit.

DESCRIPTION OF THE PREFERRED EMBODIMENTS

Figure 3A:
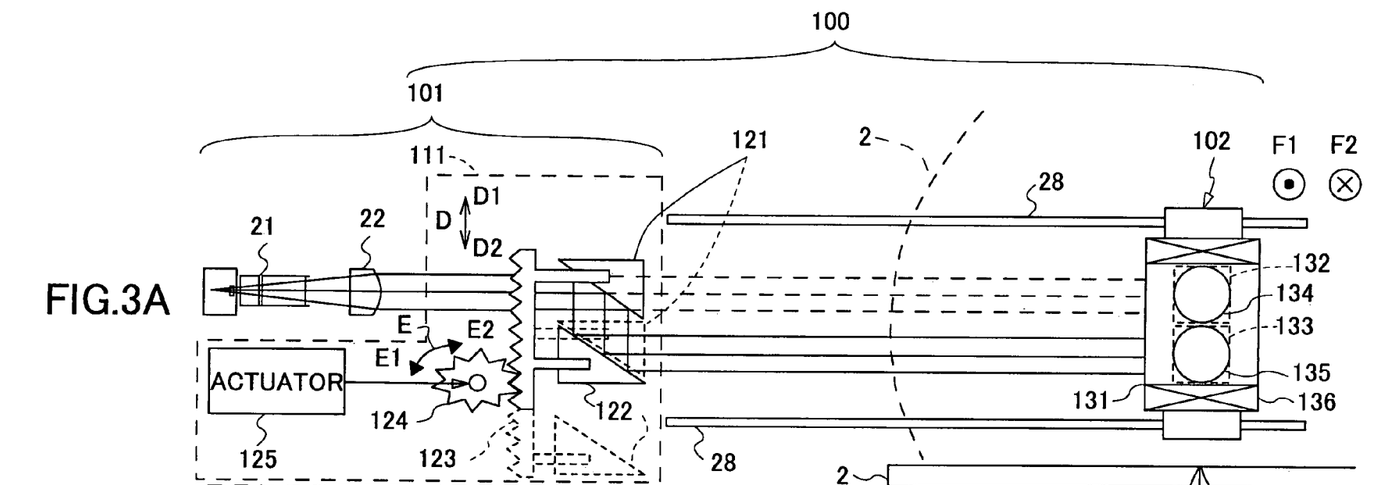
FIGS. 3A and 3B are schematic diagrams of a first embodiment of the optical device of the present invention.
Figure 3B:
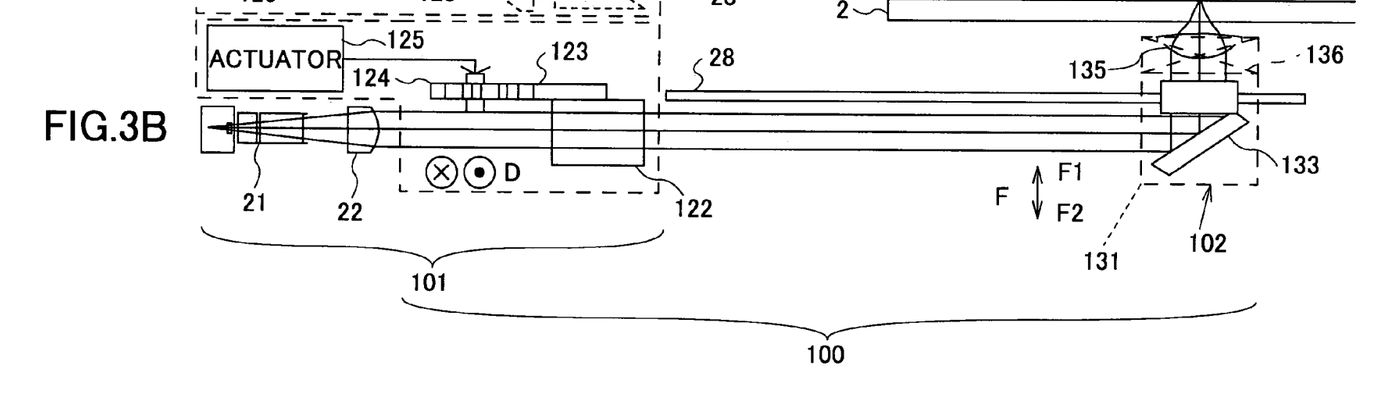

FIG. 3 is a schematic diagram of the first embodiment of the optical device of the present invention. FIG. 3A shows the upper surface, and FIG. 3B shows the side elevation of the optical device. In these drawings, the same reference marks are given to the same components as presented in FIG. 2, and the explanation thereof is omitted.

An optical device 100 of the first embodiment constitutes a separated optical system, and includes a fixed optical unit 101 and a movable optical unit 102.

The fixed optical unit 101 is fixed to a base (not shown), and includes the integrated optical head 21, the collimating lens 22, and an optical-path switching unit 111.

The optical-path switching unit 101 includes a first mirror 121, a second mirror 122, a rack gear 123, a gear 124, and an actuator 125.

Each of the first mirror 121 and the second mirror 122 includes a reflective plane formed on the slope of a prism. Both the first mirror 121 and the second mirror 122 are fixed to the rack gear 123. The rack gear 123 meshes with the gear 124, and moves in the directions of arrow D according to rotation of the gear 124. The gear 124 is connected to the actuator 125. The actuator 125 rotates the gear 124 in the directions of arrow E.

If the actuator 125 rotates the gear 124 in the direction of arrow E2, the rack gear 123 moves in the direction of arrow D2. If the rack gear 123 moves in the direction of arrow D2, the first mirror 121 and the second mirror 122 move to the positions indicated by dashed lines in FIG. 3A. That is, they move to a position out of the optical path of the light provided by the collimating lens 22.

Further, if the actuator 125 rotates the gear 124 in the direction of arrow E1, the rack gear 123 moves in the direction of arrow D1. If the rack gear 123 moves in the arrow D1 direction, the first mirror 121 and the second mirror 122 move to the positions indicated by solid lines in FIG. 3A.

The first mirror 121 is positioned out of the optical path of the light from the collimating lens 22 in the position shown by the dashed line in FIG. 3A, and it is located on the optical path of the light from the collimating lens 22 in the position shown by the solid line in FIG. 3A.

When the first mirror 121 and the second mirror 122 are in the position shown by the dashed lines in FIG. 3A, the light from the collimating lens 22 travels straight on, as dashed lines shown in FIG. 3A, and is supplied to the movable optical unit 102. Further, when the first mirror 121 is in the position shown by the solid lines in FIG. 3A, the light from the collimating lens 22 is first reflected in the direction of arrow D2 by the first mirror 121.

The light reflected in the arrow D2 direction by the first mirror 121 is incident to the second mirror 122. The second mirror 122 reflects the light from the first mirror 121 in the direction of the movable optical unit 102.

The movable optical unit 102 includes raising mirrors 132 and 133, objective lenses 134 and 135, and a focal actuator 136, all of which are mounted on a carriage 131. The light that is output from the collimating lens 22, and travels straight on, without being reflected by the first mirror 121, is input to the raising mirror 132. The raising mirror 132 reflects the light from the collimating lens 22 in the direction of the objective lens 134 direction, i.e., in the direction of arrow F1.

The light reflected by the raising mirror 132 is supplied to the objective lens 134. The objective lens 134 focuses the light from the raising mirror 132 on the disk 2. The objective lens 134 is designed so that aberration is minimized for a DVD with a substrate thickness of 0.6 mm. Further, NA is optimized for best recording/reading performances. Further, the light reflected by the disk 2 is supplied to the integrated optical head 21 via the objective lens 134, the raising, mirror 132, and the collimating lens 22.

Further, the light reflected by the second mirror 122 is input to the raising mirror 133. The raising mirror 133 reflects the light from the second mirror 122 in the direction of the objective lens 135, i.e., in the direction of arrow F1.

The light reflected by the raising mirror 133 is incident to the objective lens 135. The objective lens 135 focuses the light from the raising mirror 133 on the disk 2. The objective lens 135 is designed so that aberration is minimized for a CD with a substrate thickness of 1.2 mm. Further, NA is optimized for best recording/reading performances. Further, the light reflected by the disk 2 is supplied to the integrated optical head 21 through the objective lens 135, the raising mirror 133, the second mirror 122, the first mirror 121, and the collimating lens 22.

In addition, the focal actuator 136 moves the objective lenses 134 and 135 in the directions of arrow F1 and arrow F2. When the objective lenses 134 and 135 are moved by the focal actuator 136, focus is optimized.

For example, when a DVD is provided, the first mirror 121 is moved in the arrow D2 direction by the actuator 125. By moving the mirrors 121 and 122 in the arrow D1 direction, the light from the collimating lens 22 is supplied to the movable optical unit 102 through the path shown by the dashed lines in FIG. 3A. At this time, the light from the collimating lens 22 is reflected by the raising mirror 132, and is focused on the disk 2 by the objective lens 134. The NA of the objective lens 134 is beforehand optimized for the DVD. Accordingly, recording/reproduction for the DVD are optimized.

Further, when a CD is provided, the first mirror 121 is moved in the arrow D1 direction by the actuator 125. By moving the mirrors 121 and 122 in the arrow D1 direction, the light from the collimating lens 22 passes along the path shown by the solid line in FIG. 3A, and is supplied to the movable optical unit 102. That is, the light is reflected by the first mirror 121, is supplied to the second mirror 122, is further reflected by the second mirror 122, and is supplied to the movable optical unit 102. At this time, the light from the second mirror 122 is reflected by the raising mirror 133, and is focused on the disk 2 by the objective lens 135. The NA of the objective lens 135 is beforehand optimized for the CD. Therefore, recording/reproduction for the CD is optimized.

As mentioned above, according to this embodiment, since the optical-path switching unit is provided to the fixed optical unit, mass of the movable optical unit is made light, and seek operation at high speed is attained. Here, optical-path switching control is carried out based on recognized medium information obtained, for example, from a control zone of the medium. If the medium is of a cartridge-type, a detection switch, and the like, detects a hole formed in the cartridge according to disk classification, and the medium kind is determined.

Figure 4A:
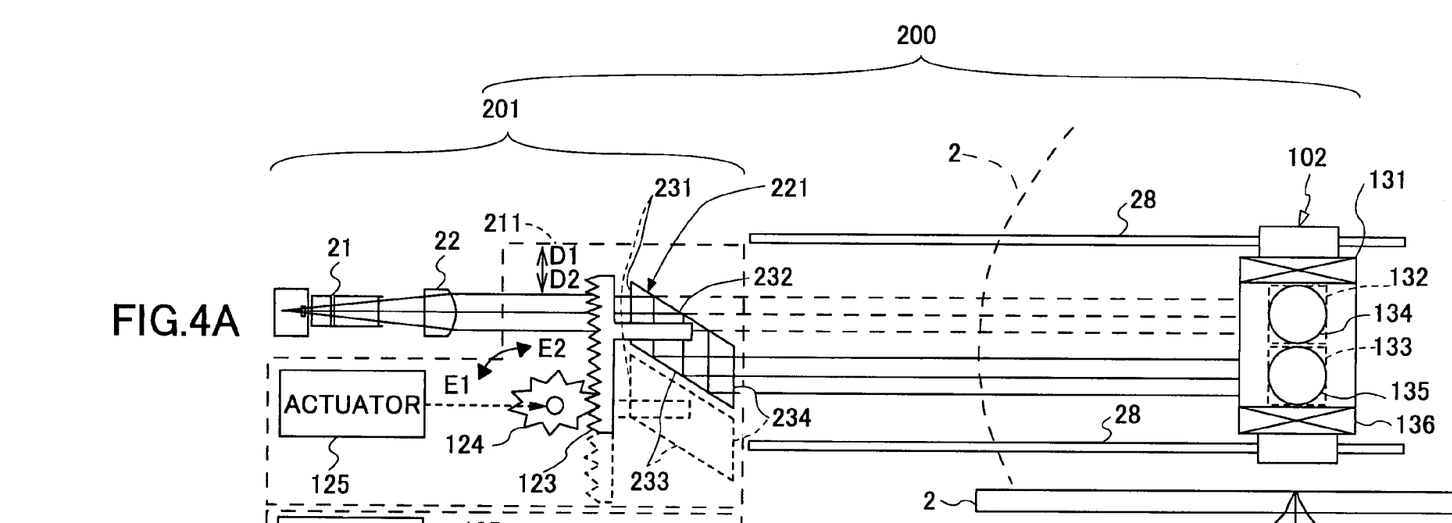
FIGS. 4A and 4B are schematic diagrams of a second embodiment of the optical device of the present invention.
Figure 4B:
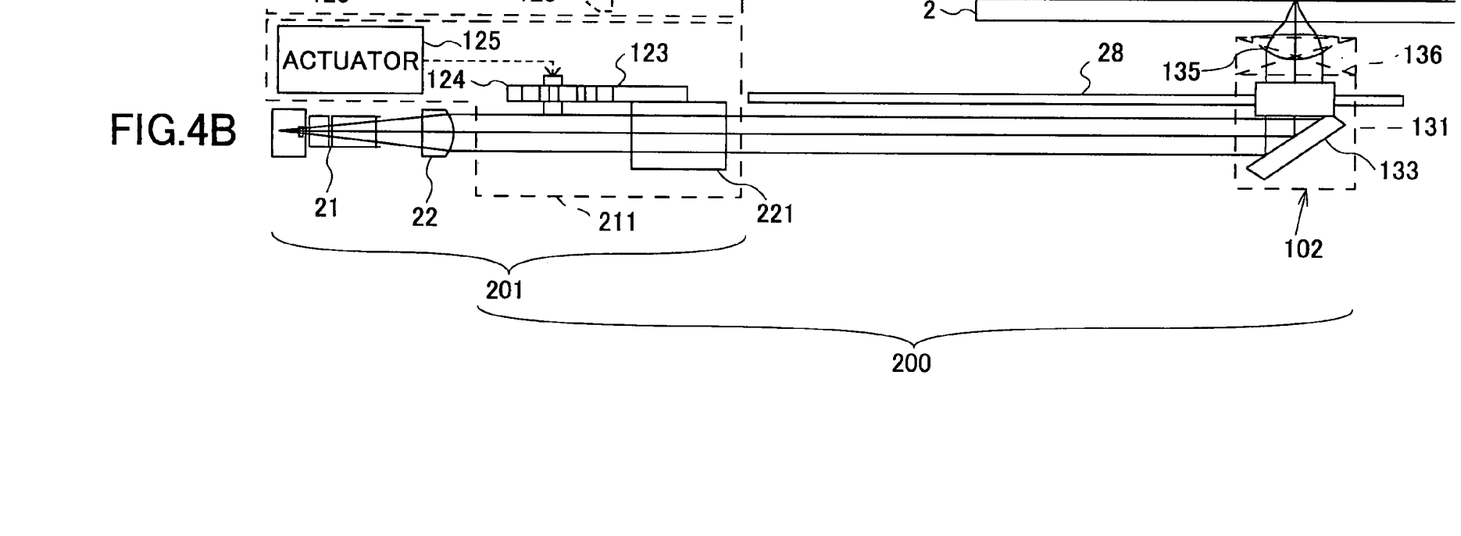

FIG. 4 is a schematic diagram of the second embodiment of the present invention. FIG. 4A shows a plan view and FIG. 4B shows a side elevation. The same reference marks are given to the same components as FIG. 3, and the explanation thereof is omitted.

An optical device 200 according to the second embodiment differs from the first embodiment in that an optical-path switching unit 211 of a fixed optical unit 201 is different from the first embodiment. The optical-path switching unit 211 of the second embodiment employs a rhomboid prism 221, instead of the first mirror 121 and the second mirror 122 of the first embodiment.

Figure 5:
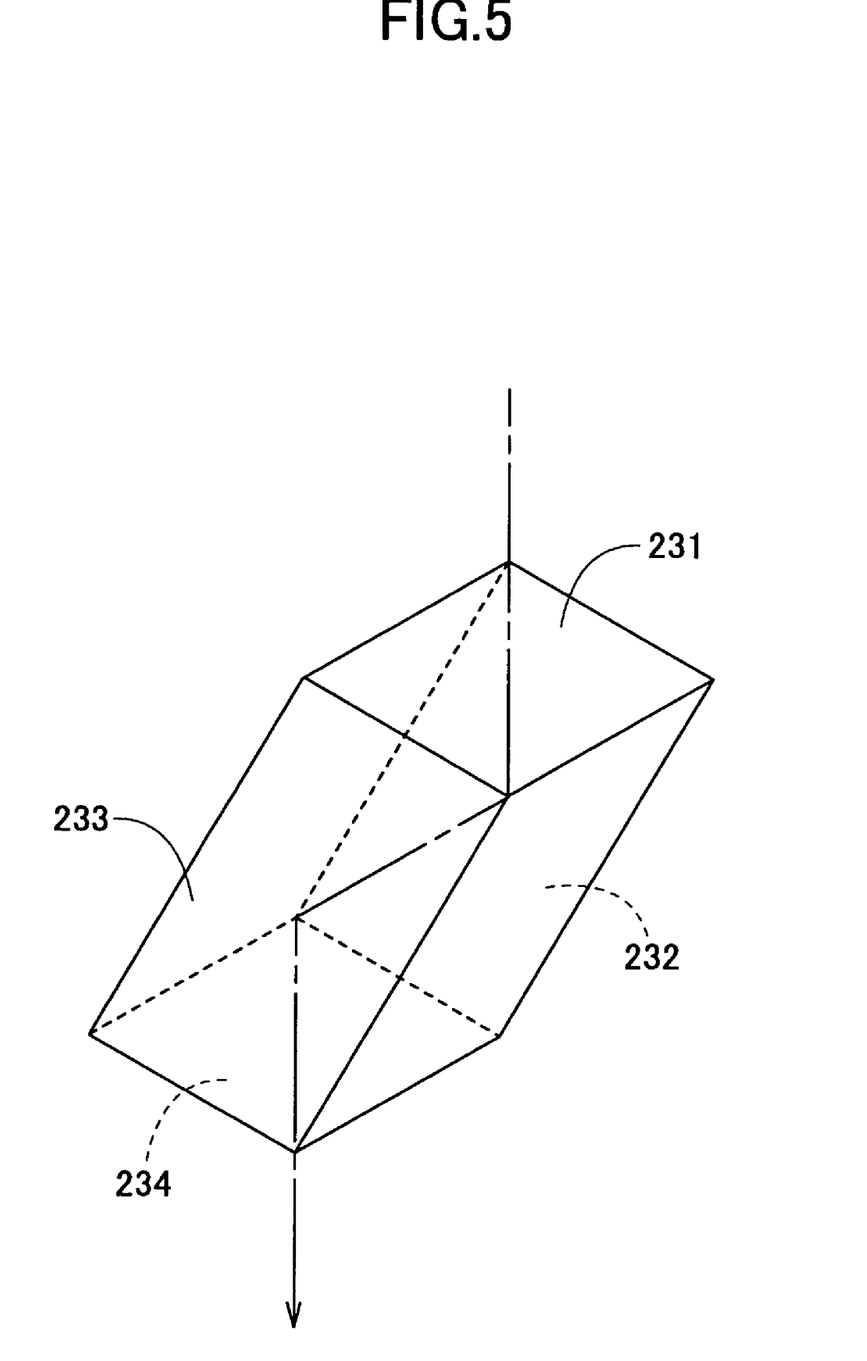
FIG. 5 is a perspective diagram of a rhomboid prism of the second embodiment of the present invention.

FIG. 5 is a perspective diagram of the rhomboid prism of the second embodiment of the present invention.

The rhomboid prism 221 is made of glass material formed in the shape of a rhomboid, and has an incidence plane 231, a first reflection plane 232, the second reflection plane 233, and an output plane 234. The incidence plane 231 is arranged to be parallel to the output plane 234, and the first reflection plane 232 is arranged to be parallel to the second reflection plane 233. Further, light supplied to the incidence plane 231 is reflected by the first reflection plane 232 and the second reflection plane 233, and then output from the output plane 234. Here, the rhomboid prism 221 is not limited to the above-mentioned form, but rather, what is necessary is just any form that can carry out the parallel displacement of the incident light.

When the actuator 125 rotates the gear 124 in the arrow E2 direction, and the rack gear 123 moves in the arrow D2 direction, the light from the collimating lens 22 is directly supplied to the raising mirror 132 of the movable optical unit 102, and the light is focused by the objective lens 134 and irradiated to the disk 2. Further, when the actuator 125 rotates the gear 124 in the arrow E1 direction, and the rack gear 123 moves in the arrow D1 direction, the light is supplied from the collimating lens 22 to the incidence plane 231 of the rhomboid prism 221.

The light input to the incidence plane 231 is supplied to the first reflection plane 232 inside the rhomboid prism 221. The first reflection plane 232 reflects the incident light in the direction that is perpendicular to the optical axis of the incident light, i.e., the arrow D2 direction.

The light reflected by the first reflection plane 232 is supplied to the second reflection plane 233. The second reflection plane 233 reflects the light from the first reflection plane 232 in the direction of the movable optical unit 102. The light reflected by the second reflection plane 233 is output from the output plane 234, and supplied to the movable optical unit 102. The light that is output from the output plane 234 of the rhomboid prism 221 is supplied to the raising mirror 133 of the movable optical unit 102, is condensed by the objective lens 135, and irradiated to the disk 2.

Figure 6:
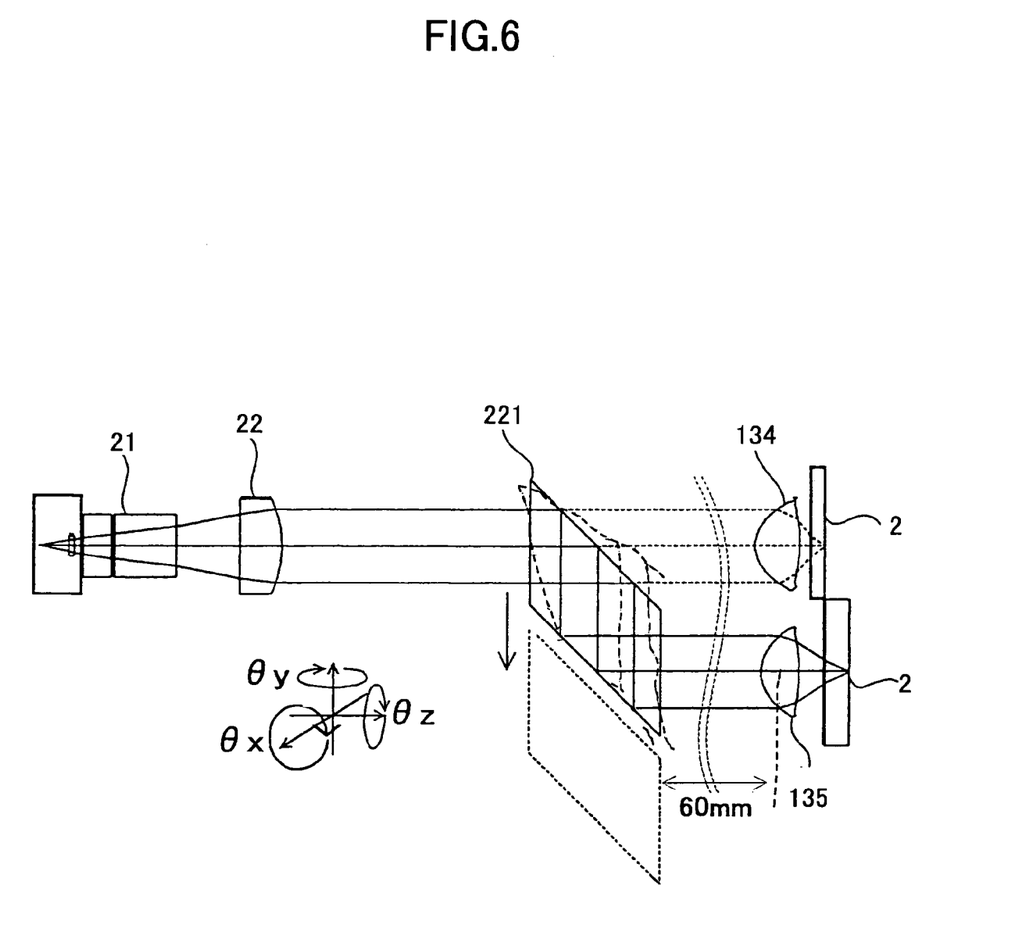
FIG. 6 and 7A–7E are diagrams showing operations of the rhomboid prism.

FIG. 6 and FIG. 7 are diagrams explaining operations of the rhomboid prism.

Deviation of optical-axis arising by rotations θx, θy and θz of the rhomboid prism 221 is explained using FIG. 6 and FIG. 7.

Figure 7A:
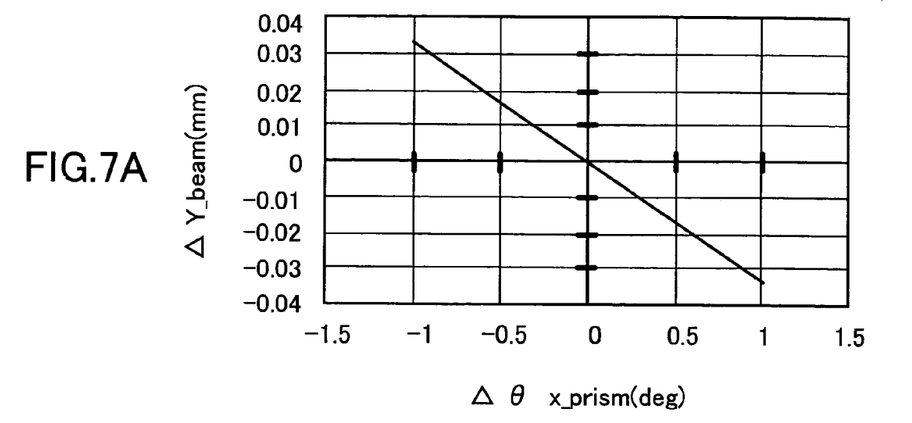
Figure 7B:
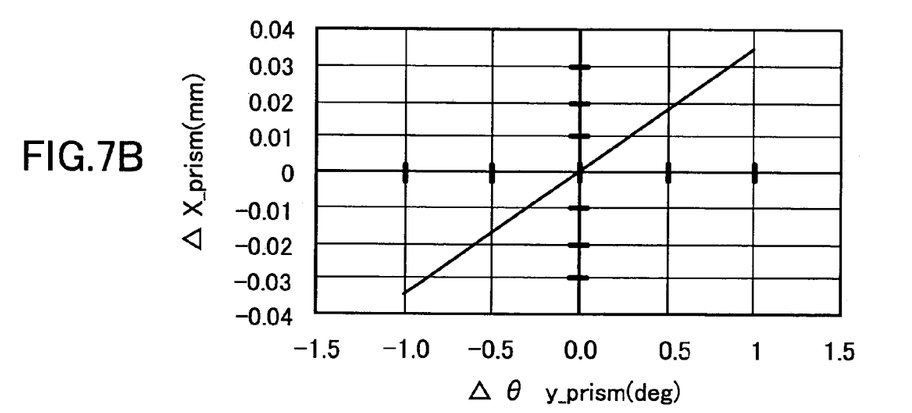
Figure 7C:
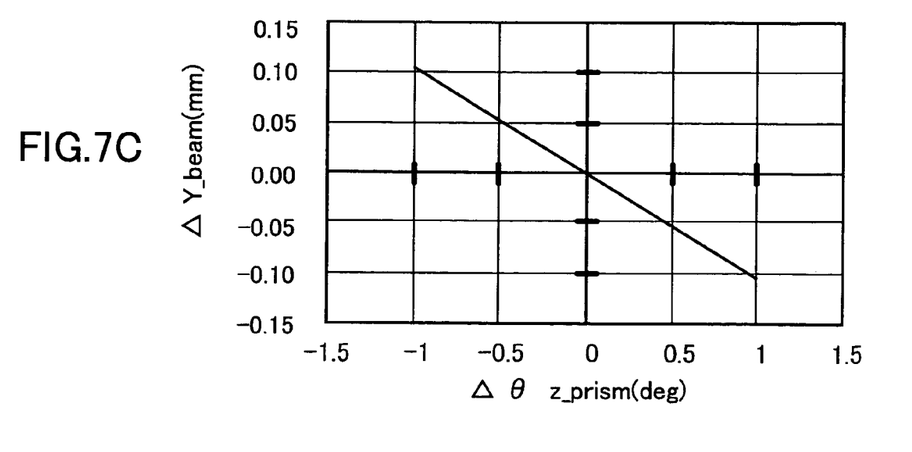

As shown in FIG. 6, the interval between the rhomboid prism 221 and the objective lens 135 is set to 60 mm. FIG. 7A shows relations between displacement Δθx prism [deg] in reference to the optical axis of the rotational angle of θx around the X-axis of the rhomboid prism 221 and Δy beam [mm] of the output beam in the direction of the Y-axis. FIG. 7B shows relations between displacement Δθy prism [deg] in reference to the optical axis of the rotational angle of θy around the Y-axis of the rhomboid prism 221 and Δx beam [mm] of the output beam in the direction of the X-axis. FIG. 7C shows relations between displacement Δθz prism [deg] in reference to the optical axis of the rotational angle of θz around the Z-axis of the rhomboid prism 221 and Δy beam [mm] of the output beam in the direction of the Y-axis.

The θz rotation generates the greatest amount of deviation. As shown in FIG. 7C, according to this embodiment, when there is a 1-degree inclination, only about 100-micrometer deviation is generated. As for θx and θy rotations, as shown in FIG. 7A and FIG. 7B, respectively, a 1-degree inclination generates about 35-micrometer optical-axis deviation, which hardly is a problem.

Since the positions of the first reflection plane 232 and the second reflection plane 233 of the rhomboid prism 221 are fixed, however the rhomboid prism 221 may move, inclination of the incident light does not occur within the rhomboid prism 221. Therefore, as shown in FIG. 7A, FIG. 7B, and FIG. 7C, the deviation due to the rotation of the rhomboid prism 221 is minimal. The configuration as described above is especially advantageous in a separated optical system, where the integrated optical head 21 and the objective lenses 134 and 135 are separately provided. This is because there is a problem with the separated optical system in that the optical axis of the incident light when the movable optical unit 102 is near the center of the disk 2 is different from when the movable optical unit 102 is near the edge of the disk 2, if inclination occurs in the light due to the distance between the integrated optical head 21 and the objective lens 135 changing.

The amount of beam deviation if the mirrors 121 and 122 are used for switching is explained below.

Figure 7D:
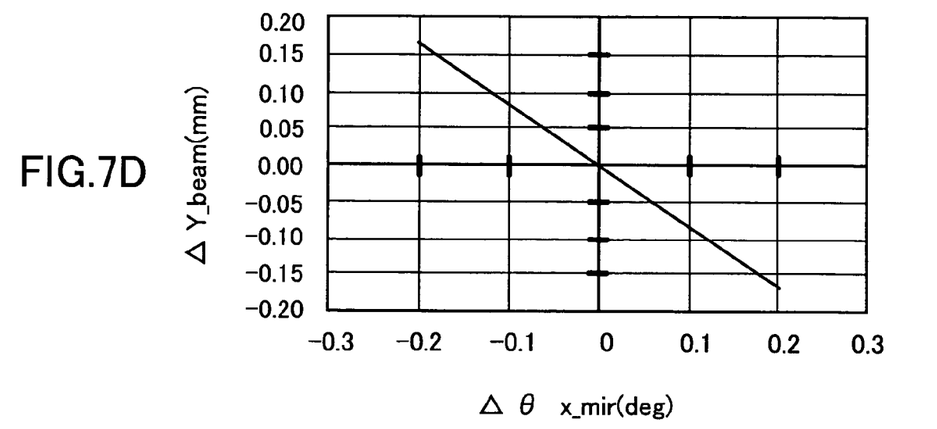
Figure 7E:
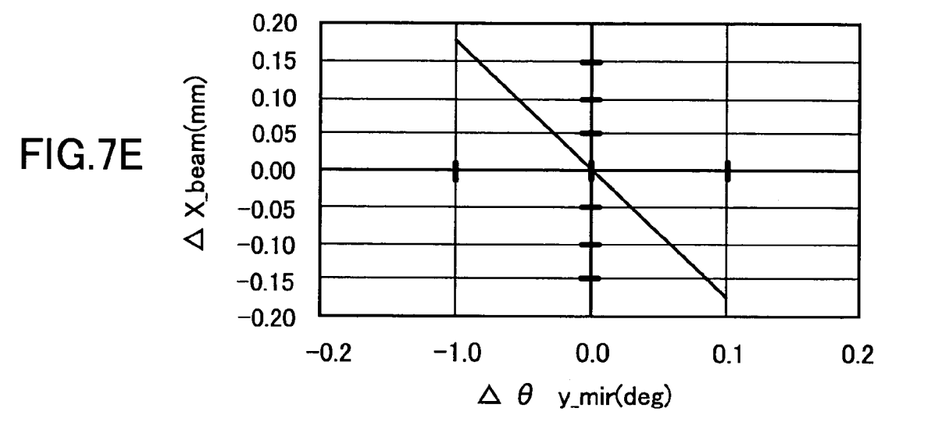

The prism 221 with reference to FIG. 6 is replaced by the mirrors 121 and 122, other components remaining the same. The amount of deviation of the beam that is input to the objective lens 135 due to inclination of the mirror 121 (the mirror 122 fix) is shown in FIG. 7D and FIG. 7E.

The amount of deviation was 178 micrometers for a rotation θx of 0.2 degrees. The amount of deviation was 178 micrometers for a rotation θy of 0.1 degree. The amounts of deviation are the limit of tolerance for an optical device. Further, as to the parallel displacement of the mirror 121, the beam input to the objective lens 135 moves by the same amount of movement of the mirror 121. However, the beam does not move perpendicularly, i.e., through the sheet of FIG. 6. For example, if the amount of deviation of the beam should be reduced to within 100 micrometers, a high degree of precise control is necessary for moving the mirror 121. Namely, moving position precision of less than 100 micrometers, θx rotation of less than 0.1 degrees, and θy rotation of less than 0.05 degrees are required.

Since the present embodiment employs the rhomboid prism 221, position deviation of the optical axis due to rotational inclination is small as shown in FIG. 7, even if the distance between the integrated optical head 21 and the objective lens 135 is changed. Accordingly, the amount of the position deviation between the inner circumference and the perimeter of the disk 2 is small.

Further, mounting of the rhomboid prism 221 requires no highly precise optical adjustments. That is, so long that the rhomboid prism 221 is installed such that the light does not protrude from the rhomboid prism 221, it is sufficient; and, accordingly, simple mechanical positioning serves the purpose. Further, positioning of the objective lens 135 to which the light is supplied through the rhomboid prism 221 requires no adjustments, if the position and parallelism of the objective lens 134 are secured in reference to the light that is directly supplied from the collimator lens 22. In other words, if the position of the objective lens 134 is adjusted with sufficient precision to the incident light, since the deviation of the incident light to the objective lens 135 is small, satisfactory performances are obtained.

Furthermore, since the rhomboid prism 121 performs the switching of the optical path, an optical-path switching mechanism as provided to the carriage 131 as shown in FIG. 2 is not required, the rhomboid prism 121 being arranged immediately after the collimator lens 22. In this manner, the carriage 131 can be of light weight, which reduces the weight of the seek-mechanism of the separated optical system. Further, this is applicable to a one-bodied optical system, wherein the advantage of the deviation of the above-mentioned optical axis being small can be enjoyed, and simplification of the switching mechanism and actuator are attained.

Here in this embodiment, although the rhomboid prism 221 is linearly moved in the directions of arrow D by the rack gear 123 and the gear 124, this is not the only configuration. For example, the movement can be provided by electromagnetism using a voice-coil motor, and magnetic attraction.

Figure 8:
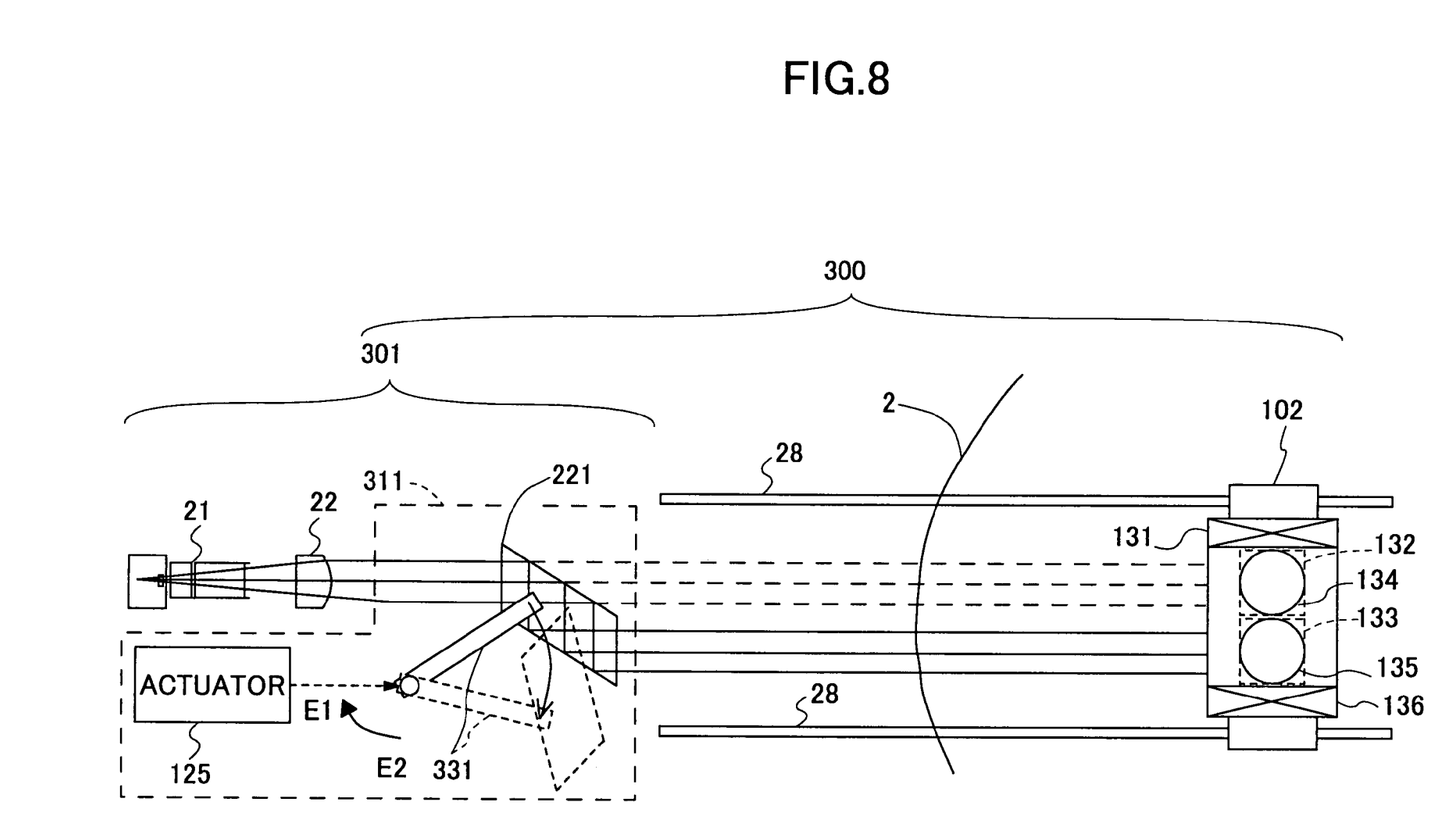
FIG. 8 is a schematic diagram of a third embodiment of the present invention.

FIG. 8 is a schematic diagram of the third embodiment of the present invention. The same reference marks are given to the same components as FIG. 4, and the explanation thereof is omitted.

An optical device 300 of this embodiment differs from the first embodiment in that an optical-path switching unit 311 of a fixed optical unit 301 is different.

The optical-path switching unit 311 of this embodiment includes the rhomboid prism 221 that is fixed to a swing arm 331. The swing arm 331 is connected to the actuator 125, and rotated by the actuator 125 in one of the directions indicated by arrows E1 and E2.

When the actuator 125 rotates the swing arm 331 in the arrow E1 direction, the rhomboid prism 221 moves to the position shown by the dashed lines in FIG. 8. When the rhomboid prism 221 moves to the position shown by the dashed lines in FIG. 8, the light from the collimator lens 22 is directly supplied to the movable optical unit 102. The light directly supplied to the movable optical unit 102 from the collimator lens 22 is reflected by the raising mirror 132, and is supplied to the objective lens 134. The objective lens 134 condenses the light from the raising mirror 132, and irradiates the light to the disk 2.

When the actuator 125 rotates the swing arm 331 in the arrow E2 direction, the rhomboid prism 221 moves to the position shown by the solid line in FIG. 8. When the rhomboid prism 221 moves to the position shown by the solid line in FIG. 8, the light from the collimator lens 22 is supplied to the movable optical unit 102 through the rhomboid prism 221. The light supplied to the movable optical unit 102 through the rhomboid prism 221 is reflected by the raising mirror 133, and is supplied to the objective lens 135. The objective lens 135 condenses the light from the raising mirror 133, and irradiates the light to the disk 2.

In addition, in this embodiment, although the rhomboid prism 221 is used, the same function as the rhomboid prism 221 is realizable by using a combination of two mirrors.

Figure 9:
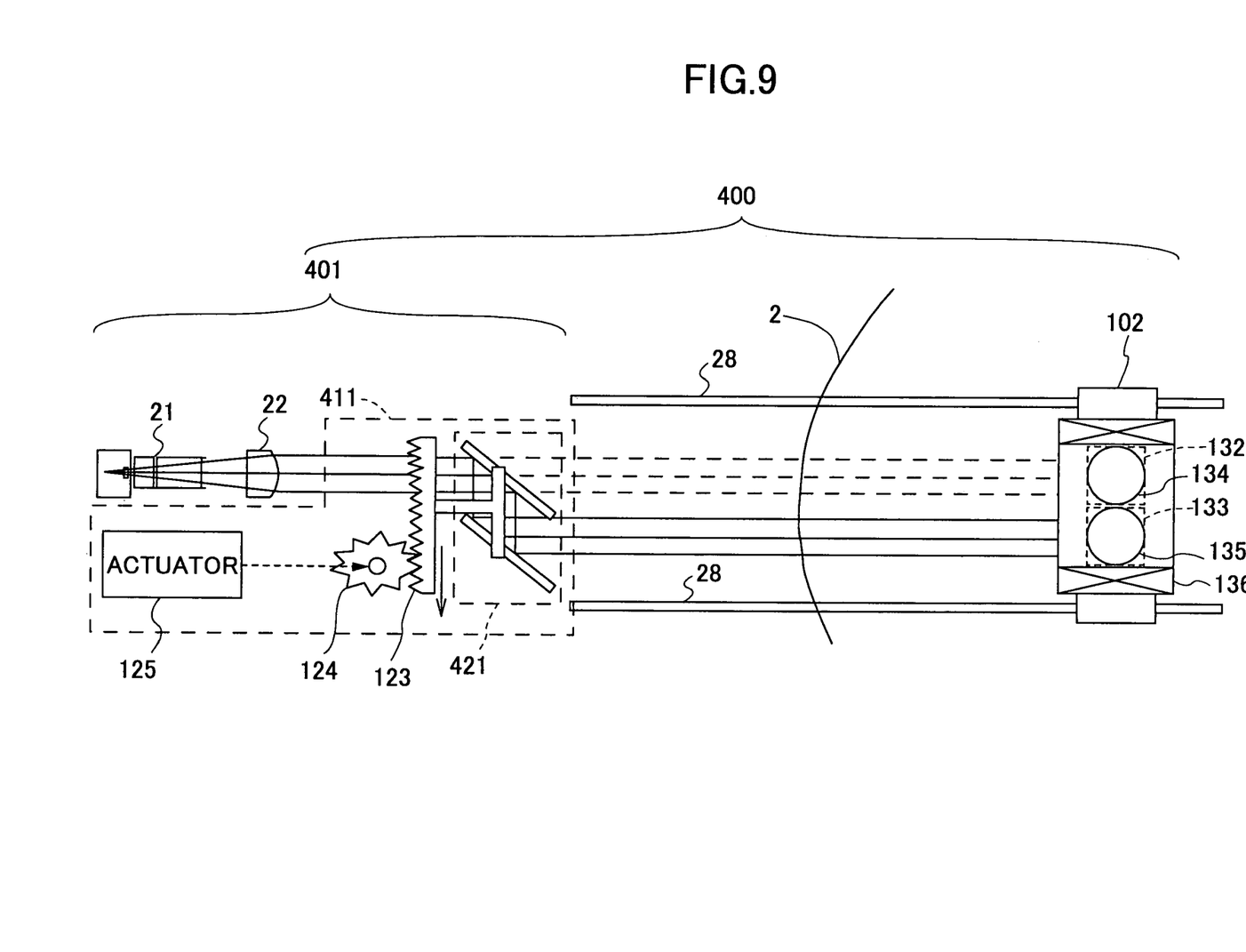
FIG. 9 is a schematic diagram of a fourth embodiment of the present invention.
Figure 10:
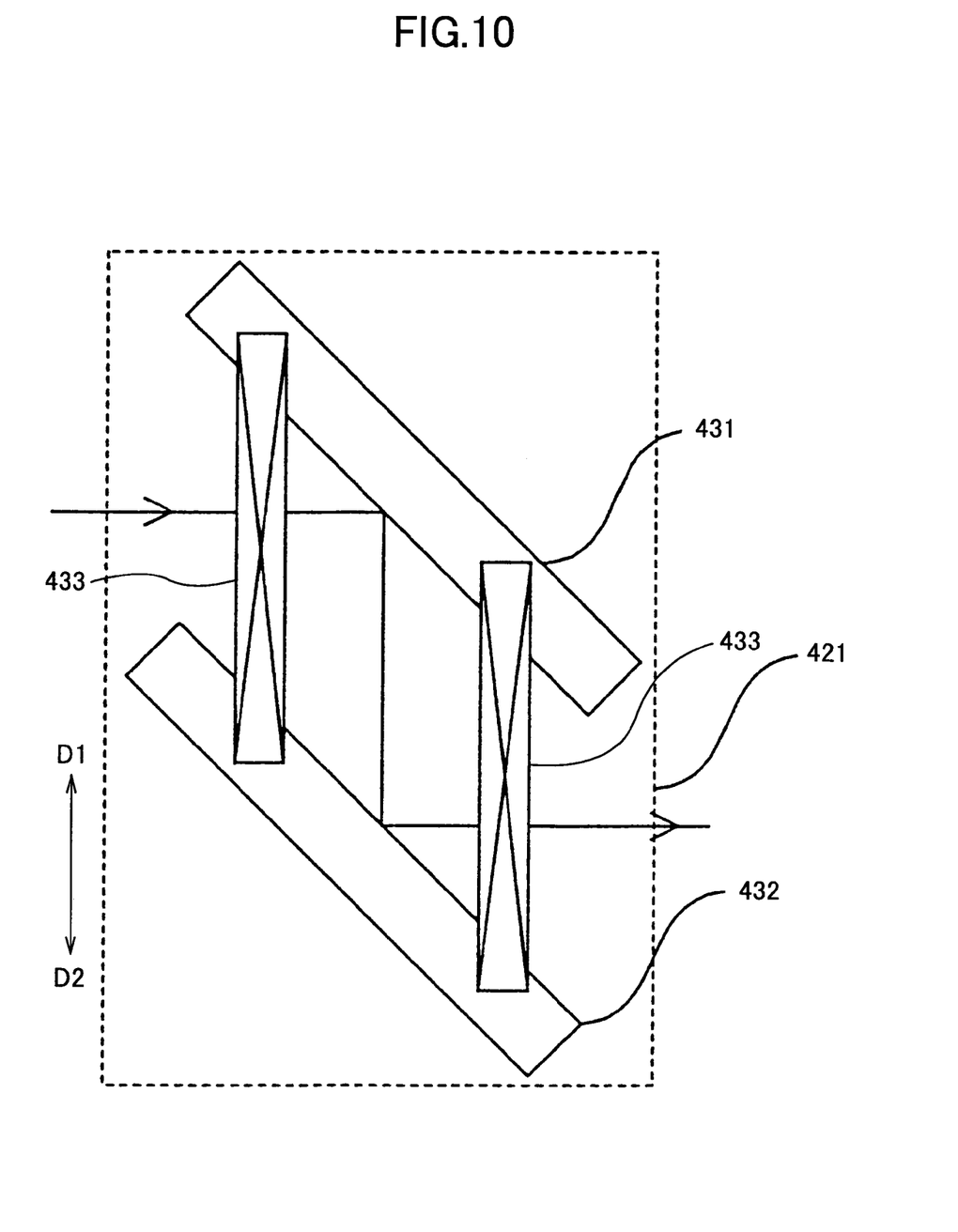
FIG. 10 is a partial view of the principal part of the fourth embodiment of the present invention.

FIG. 9 is a schematic diagram of the fourth embodiment of the present invention, and FIG. 10 is a partial view of the principal part of the fourth embodiment of the present invention. The same reference marks are given to the same components as FIG. 4, and the explanation thereof is omitted.

An optical device 400 of this embodiment differs from the first embodiment in that an optical-path switching unit 411 that is included in a fixed optical unit 401 is different. The optical-path switching unit 411 of this embodiment includes a mirror pair 421 in place of the rhomboid prism 221.

The mirror pair 421 includes a first mirror 431 and a second mirror 432 that are connected by a connecting unit 433 as shown in FIG. 10. The connecting unit 433 connects the first mirror 431 and the second mirror 432, keeping them in parallel. The incident light from the collimating lens 22 is provided to the first mirror 431. The first mirror 431 reflects the light from the collimating lens 22 in the arrow D2 direction. The light reflected by the first mirror 431 is provided to the second mirror 432. The second mirror 432 reflects the light from the first mirror 431 in the direction parallel to the light from the collimating lens 22. In this manner, the mirror pair 421 realizes the same function as the rhomboid prism 221. The mirror pair 421 can be constituted lightweight compared to the rhomboid prism 221.

In addition, similar to the third embodiment, it is also possible to evacuate the mirror pair 421 from the optical path of the light from the collimating lens 22 by the actuator 125 and the swing arm 331.

In addition, although the optical-path switching units 101, 201, 301, and 401 of the present invention are applied to the separated optical systems in the above-mentioned embodiments, since the optical-path switching units 101, 201, and 301 are lighter than what is shown in FIG. 2, application to a one-bodied optical system is also possible.

Figure 11:
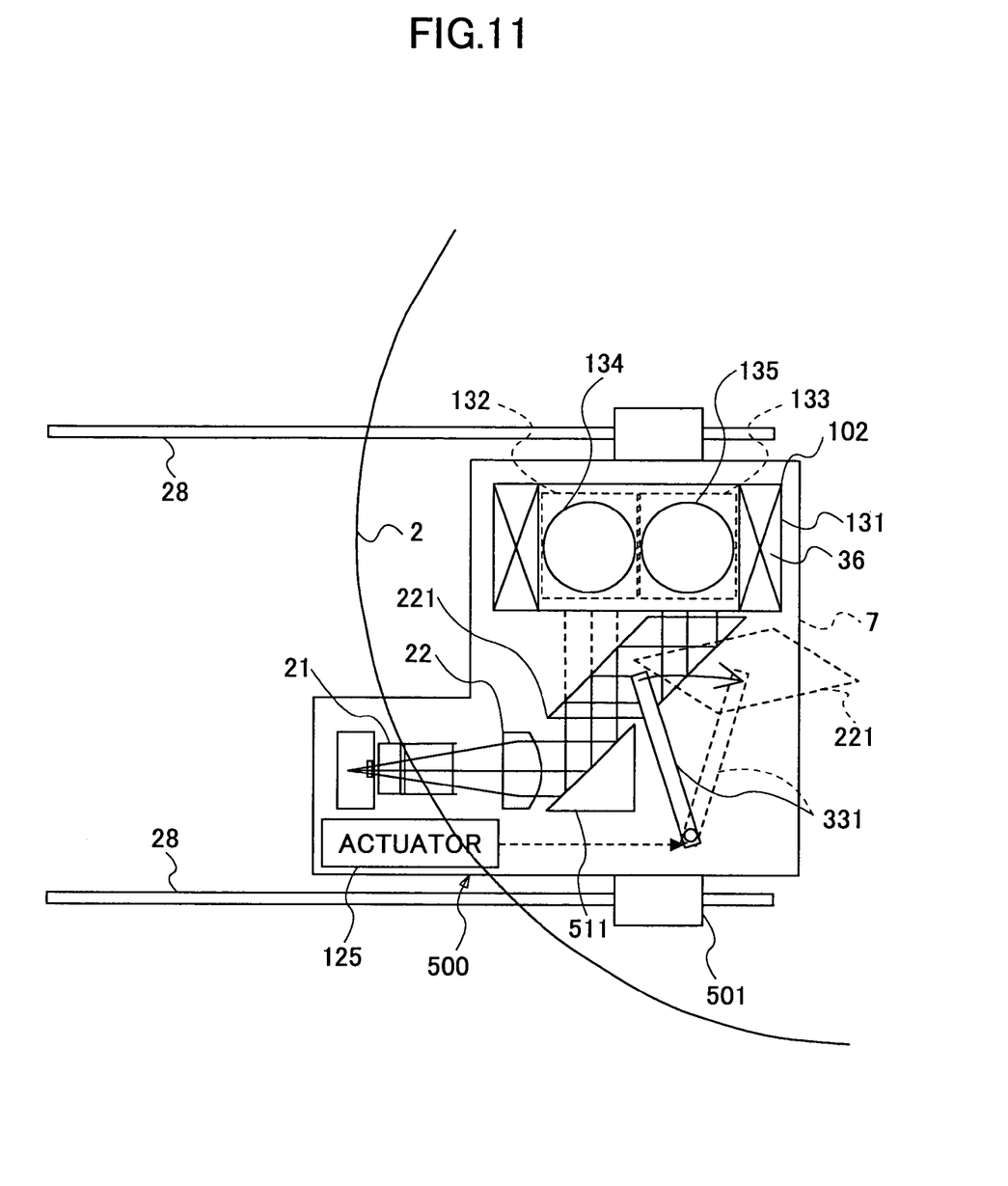
FIG. 11 is a schematic diagram of a fifth embodiment of the present invention.

FIG. 11 is a schematic diagram of the fifth embodiment of the present invention. The same reference marks are given to the same components as FIG. 8, and the explanation thereof is omitted.

An optical device 500 of this embodiment includes the integrated optical head 21, the collimating lens 22, a reflective unit 511, the actuator 125, the swing arm 331, and the movable optical unit 102, all of which are mounted on a carriage 501 as one body.

The light from the collimating lens 22 is irradiated in the radius direction of the disk 2, and supplied to the reflective unit 511. The reflective unit 511 reflects the light from the collimating lens 22 in the direction of the movable optical unit 102. The light reflected by the reflective unit 511 is provided to the movable optical unit 102 either directly or through the rhomboid prism 221.

The light directly supplied to the movable optical unit 102 from the reflective unit 411 is supplied to the raising mirror 132 of the movable optical unit 102. The raising mirror 132 reflects the light from the reflective unit 411 in the direction of the objective lens 134. The objective lens 134 condenses the light from the raising mirror 132, and irradiates the light to the disk 2. Further, the light supplied to the movable optical unit 102 through the rhomboid prism 221 is supplied to the raising mirror 133 of the movable optical unit 102. The raising mirror 133 reflects the light from the rhomboid prism 221 in the direction of the objective lens 135. The objective lens 135 condenses the light from the raising mirror 133, and irradiates the light to the disk 2.

In addition, although, according to this embodiment, the rhomboid prism 221 is evacuated by the swing arm 331 from the optical path of the light that comes out of the collimating lens 22, the rack gear 123 and the gear 124 can be used as in the first embodiment.

Furthermore, although, according to this embodiment, the rhomboid prism 221 switches the optical path, the mirror pair 421 as in the fourth embodiment may be used. By using the mirror pair 421, the optical device 500 can be made further lightweight, and the response of the seek operation can be improved.

Further, the optical device of the present invention includes common optical devices that include an optical head, information recording/reproducing apparatuses that use light, and optical-path switching.

In addition, the present invention is not limited to the above-mentioned embodiments, but various modifications are possible based on the scope of the claims.

What is claimed is:

1. An information recording and/or reproducing apparatus able to record and/or reproduce information in a plurality of different recording media, comprising:
   an optical head having a light source for emitting incident light in an incident light path and an optical detector for detecting returned light reflected on the recording media;
   a plurality of object lenses arranged in a plurality of output light paths corresponding to the plurality of recording media, respectively; and
   a light path switching device that is provided between the optical head and the plurality of object lenses and is able to be moved to a position in the incident light path and a position out of the incident light path to direct the incident light to one of the recording media through one corresponding object lens,
   wherein
   the light path switching device includes a first reflecting surface and a second reflecting surface in parallel to each other and formed in one body, and a moving unit that moves the first reflecting surface and the second reflecting surface to the position in the incident light path and the position out of the incident light path, when being located at the position in the incident light path, the first reflecting surface reflects the incident light to the second reflecting surface, and the second reflecting surface reflects the light from the first reflecting surface to one of the output optical paths, the light incident on one of the recording media is reflected by the one of the recording media, returned to the optical head through the light path switching device, and is detected by the optical detector, and the moving unit is controlled based on a detection result of the kind of recording media.

2. The information recording and/or reproducing apparatus as claimed in claim 1, wherein the first reflecting surface and the second reflecting surface are moved by the moving unit to perform translational movement.

3. The information recording and/or reproducing apparatus as claimed in claim 1, wherein the first reflecting surface and the second reflecting surface are moved by the moving unit to perform rotational movement.

4. The information recording and/or reproducing apparatus as claimed in any one of claims 1 through 3, wherein the first reflecting surface and the second reflecting surface are two surfaces of a prism.

5. The information recording and/or reproducing apparatus as claimed in claim 4, wherein the prism is a rhomboid prism.

6. The information recording and/or reproducing apparatus as claimed in any one of claims 1 through 3, wherein the first reflecting surface and the second reflecting surface are surfaces of two mirrors fixed on a holder.

* * * * *